UNITED STATES PATENT OFFICE.

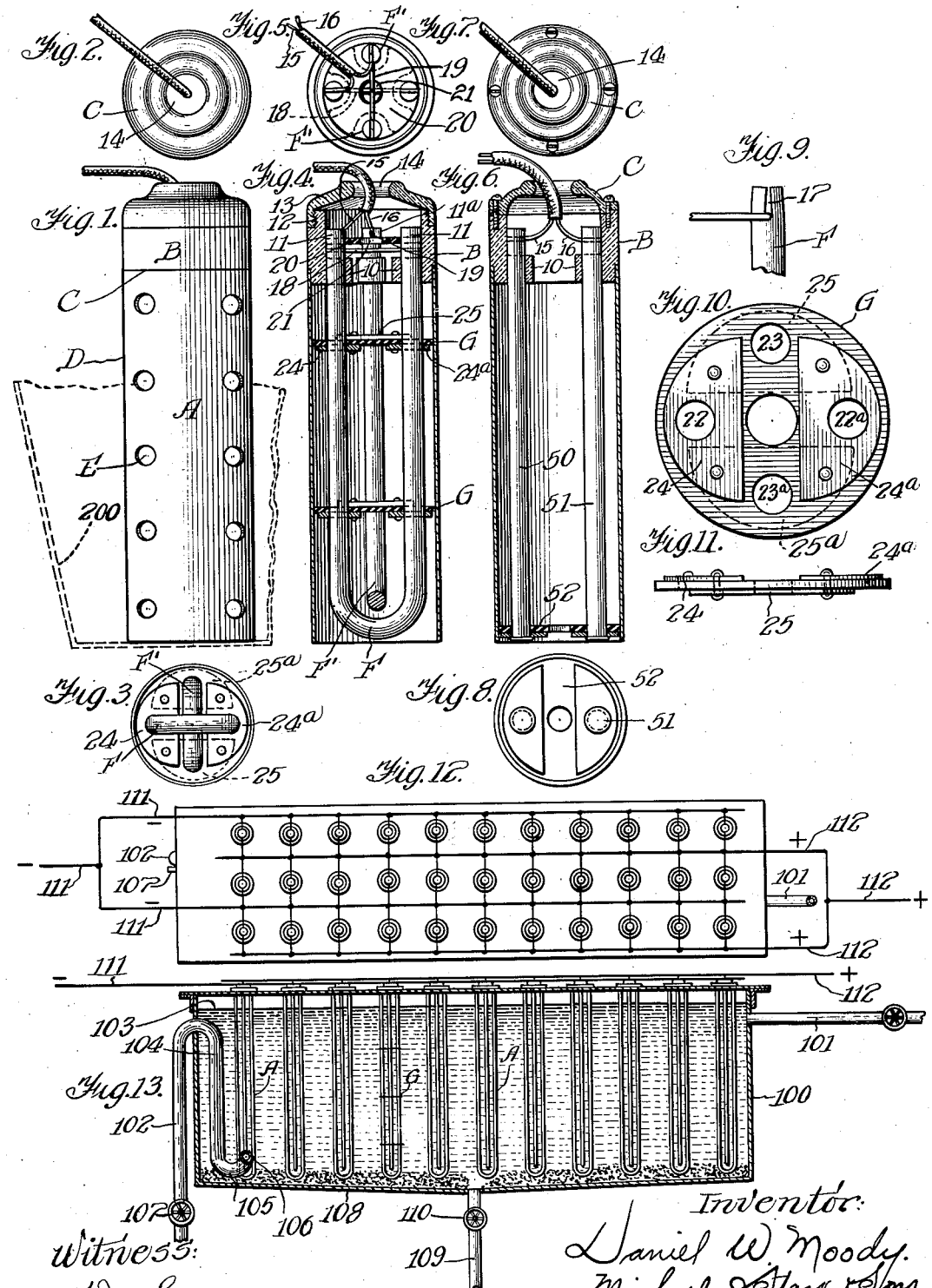

DANIEL W. MOODY, OF CHICAGO, ILLINOIS, ASSIGNOR OF THREE-TENTHS TO WALTER E. FULLER AND THREE-TENTHS TO CARL E. OLSON, BOTH OF CHICAGO, ILLINOIS.

WATER-PURIFIER.

1,183,753.  Specification of Letters Patent.  Patented May 16, 1916.

Application filed July 8, 1915. Serial No. 38,638.

*To all whom it may concern:*

Be it known that I, DANIEL W. MOODY, a citizen of the United States, and a resident of the city of Chicago, in the county of Cook and State of Illinois, have invented a certain new and useful Improvement in Water-Purifiers; and I do hereby declare that the following description of my said invention, taken in connection with the accompanying sheet of drawing, forms a full, clear, and exact specification, which will enable others skilled in the art to which it appertains to make and use the same.

My invention relates generally to improvements in water purifiers, and it consists, essentially, in the novel and peculiar combination of parts and details of construction, as hereinafter first fully set forth and described and then pointed out in the claims.

The essence of my invention resides particularly in the production of a simple, efficient, and cheap device for the destruction of bacteria and other organic matter in water intended for drinking or other purposes, and for hastening the precipitation of solids or inorganic matter in the water, so as to quickly purify the same. This result is accomplished by electrolytic action, and my device, in its simplest form, is constructed for use in households, whereby the apparatus may be immersed in a vessel of water to be treated and connected to any source of electric supply, as for instance a socket for an electric lamp, such as is found in any house wired for electric current.

Another feature of my invention is the arrangement of the electrodes, whereby an intensified action in the electrolyte is effected, and the process of purification accelerated.

While above I have stated that in its simplest form, my device is intended for household purposes, a multiplicity of these devices, electrically connected, may be introduced into a large storage tank or vat for the purification of large bodies of water, as for use in hotels, large restaurants, ice plants and the like.

In the drawing already referred to, which serves to better illustrate my invention, Figure 1 is a side elevation thereof; a pail or other vessel into which the device is introduced being shown in dotted lines. Fig. 2 is a top plan and Fig. 3 a bottom plan of my invention in its preferred form of construction. Fig. 4 is a vertical longitudinal section of my invention and Fig. 5 a plan thereof with the top cap removed to show the electrical connections. Fig. 6 is a vertical, longitudinal section of a slightly modified type of my invention; Fig. 7, a top plan, and Fig. 8, a bottom plan thereof. Fig. 9 is an elevation of simple means for making the electrical connections. Fig. 10 is a bottom plan of a diaphragm used in the preferred mode of construction. Fig. 11 is an edge view of the diaphragm. Fig. 12 is a plan of a closed vat or tank containing a plurality of my devices and showing the electrical connections therefor, and Fig. 13 is a longitudinal, vertical section through said tank or vat.

Like parts are designated by corresponding characters or symbols of reference in all the figures of the drawing.

In its entirety my device is designated as A and comprises essentially a cylindrical top member B, possessed of a shouldered portion C at the lower end thereof, for the reception thereover of a covering tube D, which tube is possessed of a plurality of perforations E, and extends slightly beyond the lower end of metallic electrodes F and F' hereinafter more fully described. And attention is now directed to the fact that the said covering tube may be entirely dispensed with without affecting the functions of my invention.

The top member B is preferably made from porcelain or other material not affected by gases, moisture, or acidulous fumes and is hollow axially, there being, however, radial bosses 10, on the interior wall thereof, which bosses are longitudinally apertured for the passage therethrough of the upper ends 11 and 11$^a$ of the electrodes F and F'. At the upper end of said top member B, the same is reduced in diameter and provided with a screw thread 12, which thread coöperates with a like internal thread on a cap 13, which is adapted to close the opening in the upper end of the member B. Axially of this cap 13, however, there is an aperture 14, to permit the passage therethrough of wires 15 and 16, which wires are insulated from each other and are, respectively, connected to the upper ends 11 and 11$^a$ of the electrodes F and F'.

The electrodes F and F' are preferably round in cross section and are bent into an elongated U shape with the upper ends 11 and 11ᵃ projecting through the apertures in the bosses 10 of the top member B, and it is to be here explained that the said electrodes are disposed at substantially right angles to each other, and that the electrode F' is sufficiently shorter than the electrode F to permit of this disposition in a manner easily comprehended.

The upper ends 11 and 11ᵃ of the electrodes F and F', which project through the bosses 10, are sawed and pinched together as shown at 17, Fig. 9, for the reception of wires 18 and 19, connecting the opposite legs of their respective electrodes F and F', and likewise for the attachment of the electric lead wires 15 and 16 to one of the legs of each of said electrodes. And, between the wires 18 and 19, there is interposed a disk of insulating material 20, preventing any possibility of short circuit between the wires 18 and 19. In this disk of insulating material 20 there is provided an aperture 21 for purposes of ventilation within the top member B.

If desired, there may be at spaced intervals on the electrodes F and F' diaphragms G, detailed in Figs. 10 and 11. These diaphragms are of insulating material and are possessed of through apertures 22 and 22ᵃ for the passage there through of the legs of the U-shaped electrode F, and, like openings 23 and 23ᵃ, for the legs of the electrode F'. Upon one face of these diaphragms are fastened sheet metallic semi-disk like members 24 and 24ᵃ, embracing the legs of the electrode F and terminating a short distance from the legs of the electrode F'; and, on the opposite face of said diaphragms are like members 25 and 25ᵃ embracing the legs of the electrode F' and terminating a short distance from the legs of the electrode F. The object of these members is to shorten the gap between the electrodes F and F'. From Fig. 4, it will be noted that the bends of the electrodes are closer to one another than their legs. Therefore, the electrolytic action would practically be concentrated at this point were it not for the plates 24, 24ᵃ, 25 and 25ᵃ. The metal plates, being electrically connected with the supporting legs of the electrode, have their edges spaced from the legs of the opposing electrodes a distance less than that intervening the bends of the electrodes, as depicted in Figs. 4 and 10, whereby the electrolytic action will be distributed at the points where the plates are located, such disposition of the plates and diaphragms being suitably predetermined.

In Figs. 6, 7, and 8 I disclose my invention as having two straight metallic electrodes 50 and 51 of opposite polarity, instead of the U-shaped electrodes F and F'. The said electrodes 50 and 51 are connected at their lower ends by an insulating diaphragm 52. This device is intended for use in homes where but a small quantity of water is to be treated at a time, and is a modification of my invention.

In Figs. 12 and 13 I illustrate a tank or vat equipped with my purifiers A. In these views 100 represents the said tank or vat as a whole, while 101 indicates an inlet pipe for the admission of unpurified water into said tank, and 102 an outlet pipe therefrom. The said outlet pipe extends from the tank downwardly, below the normal water level 103 thereof, and within said tank likewise extends downwardly as at 104, to a short distance from the bottom of said tank and then bends upwardly as at 105, there being a horizontal opening 106 for entrance into said outlet pipe at the upper termination of the upward bend 105, said opening 106 being thus located to prevent the gravity flow of precipitated matter into said opening. And it is now to be observed that the exterior pipe 102, with its interior branch 104, upturned bend 105, and opening 106 forms a siphon, whereby upon opening the valve 107, water from within the tank will flow therefrom. The opening 106 is located above the sediment deposited upon the bottom 108 of the tank, and far below the frothy impure matter created by the electrolytic action of my device, floating upon the surface 103 of the water, and therefore clear, pure water only will be withdrawn from the tank. The sediment or precipitation deposited upon the bottom of the tank is discharged through a sediment discharge pipe 109, governed by a valve 110. The electrical connections to the plurality of devices A in the tank 100 are clearly shown in Fig. 12, in which 111 are the negative feeders to the said devices and 112 the positive feeders thereto.

It is now to be stated that my device is as adaptable to an alternating current of electricity as to a direct current. As a matter of fact a greater degree of efficiency is observed in the employment of an alternating current, due to the characteristic peculiarities of that current.

In Fig. 1 I have indicated in dotted lines a vessel 200, which may be an ordinary kitchen pail, or like utensil containing water to be treated, and it is to be mentioned that when the clear or purified water is removed from the vessel 200, it should be preferably withdrawn by siphonic action from near the bottom of the vessel above the solid sediment therein and below the impurities carried in the form of frothy matter upon the surface of the water.

I have hereinbefore disclosed the preferred mode of practising my invention, but I reserve the right to make such and any changes as might occur to one skilled in the art to which this invention appertains, or to make any and all such alterations as may be permitted under the doctrine of equivalents.

Having thus fully described my invention I claim as new, and desire to secure to myself by Letters Patent of the United States:—

1. In a device of the class described, adapted for immersion into an electrolyte including an insulating structure and electrodes depending therefrom, said electrodes being adapted to be connected to a source of electric supply, an insulating diaphragm connecting said electrodes, and non-insulating members on said diaphragm, each connected to one electrode and extending toward an electrode of opposite polarity, to reduce the gap between said electrodes.

2. In a device of the class described adapted for immersion into an electrolyte, including an insulating structure and a pair of U-shaped electrodes depending therefrom angularly to each other, the upstanding legs of one electrode being connected together within said structure and the like legs of the other electrode being likewise connected together, there being insulating material between and separating said connecting means, a source of electric supply for said electrodes, and means on the legs of said electrodes shortening the gap there between.

3. In the electric purification of liquids, a tank for containing the liquid, and a pair of U-shaped electrodes immersed in the liquid in said tank, said electrodes being arranged with their legs extending parallel and located at each of the four corners of an imaginary square bounding said legs and the bend of one electrode located above the bend of the other electrode.

4. In the electric purification of liquids, a tank for containing the liquid, a pair of U-shaped electrodes immersed in the liquid in said tank, said electrodes being arranged with their legs extending parallel and located at each of the four corners of an imaginary square bounding said legs, the bend of one electrode located above the bend of the other electrode, and the electrodes approaching each other at their bends to shorten the gap.

5. In the electric purification of liquids, a tank for containing the liquid, a pair of U-shaped electrodes immersed in the liquid in said tank, the bend of one electrode being located within and spaced from the bend of the other electrode.

6. In an apparatus of the class described, a tank for containing liquid, a plurality of electrodes in separated arrangement depending into and immersed in the liquid in the tank, an insulating diaphragm having apertures through which the electrodes fit, and metal plates attached to said diaphragm and respectively connected to the electrodes, said plates having parts arranged in proximity to provide an electrolytic path therebetween.

7. In the electric purification of liquids, a tank for containing the liquid, a pair of U-shaped electrodes immersed in the liquid in said tank, said electrodes being arranged with the legs of one electrode parallel with but in a plane at an angle with the legs of the other electrode, and the bend joining the legs of one electrode extending above and crossing the bend between the legs of the other electrode.

8. In an apparatus of the class described, a plurality of depending electrodes connected together in pairs with the connection between one pair crossing above the connection of the other pair.

In testimony that I claim the foregoing as my invention, I have hereunto set my hand.

DANIEL W. MOODY.